United States Patent
Fujii

[11] 3,845,311
[45] Oct. 29, 1974

[54] APPARATUS FOR MEASURING NEUTRON FLUX

[75] Inventor: Masaaki Fujii, Sagamihara, Japan

[73] Assignee: Hitachi, Ltd., Tokyo, Japan

[22] Filed: Dec. 6, 1971

[21] Appl. No.: 204,825

[30] Foreign Application Priority Data
Dec. 4, 1970 Japan.............................. 45-106833

[52] U.S. Cl...................... 250/390, 176/19, 176/26
[51] Int. Cl............................................. G01t 3/00
[58] Field of Search .......... 250/43.5 MR, 83.1, 390, 250/391, 392

[56] References Cited
UNITED STATES PATENTS
3,130,307   4/1964   Russell.............................. 250/83.1
3,140,396   7/1964   Spaa et al. ......................... 250/83.1

Primary Examiner—James W. Lawrence
Assistant Examiner—Davis L. Willis
Attorney, Agent, or Firm—Craig & Antonelli

[57] ABSTRACT

An apparatus for measuring neutron flux in a nuclear reactor in which the neutron flux distribution within the reactor core is represented by a predetermined function, and the velocity of a neutron detecting fluid circulating through the reactor core is varied and/or various neutron detecting fluids having different decay constants are circulated through the reactor core to measure the radioactivity induced in the fluid or fluids thereby seeking the above function for determining the power distribution within the reactor core.

8 Claims, 2 Drawing Figures

PATENTED OCT 29 1974 3,845,311

INVENTOR

MASAAKI FUJII

BY Craig, Antonelli & Hill
ATTORNEYS

3,845,311

APPARATUS FOR MEASURING NEUTRON FLUX

This invention relates to improvements in apparatus for measuring the distribution of power within the core of a nuclear reactor.

In prior art apparatus for measuring the power distribution within the core of nuclear reactors on the basis of the activation method, means such as a ball or foil, pin or wire of a material for detecting neutrons is inserted into a guide tube disposed within the reactor core and is taken out after the irradiation with neutrons over a suitable period of time and the radioactivity induced in the neutron detecting material is detected by a neutron detector for measuring the activation distribution within the reactor core. Then, the waiting term (or cooling term) ranging from the completion of the irradiation to the initiation of the measurement as well as the sensitivity of the neutron detecting material is suitably compensated for obtaining the relative distribution of the neutron flux.

Thus, according to the prior art method, there is a time lag between the activation of the neutron detecting material by the irradiation with neutrons and the measurement of the radioactivity induced in the detecting material. Further, in the prior art method above described, tens of measuring tubes are generally disposed in the longitudinal direction of the reactor core (although the number of such tubes varies depending on the size of the reactor core), and the measurement above described is taken at each of these points to obtain the neutron flux distribution within the entire area of the reactor core. The prior art method is thus defective in that an extended period of time is required until the measurement of all these points is finished. Further, with the prior art apparatus, a difficulty is encountered in smoothly putting the neutron detecting material into and out of the narrow guide tubes of several millimeters in diameter, and another difficulty is encountered in that the irradiation time must be varied and the neutron detecting material must be replaced by another suitable detecting material in order to vary the sensitivity of neutron detection.

It is therefore an object of the present invention to provide an apparatus which can easily and rapidly measure neutron flux in a reactor core thereby remarkably reducing the period of time required for the measurement of the power distribution within the reactor core.

Another object of the present invention is to provide an apparatus which can continuously measure the neutron flux.

A further object of the present invention is to provide an apparatus in which a neutron detecting material in fluid form is employed so as to facilitate the insertion and with-drawal of the neutron detecting material into and out of the reactor core and facilitate the variation of the neutron detection sensitivity.

In accordance with the present invention, there is provided an apparatus for measuring neutron flux in a reactor core comprising a closed circuit formed by tubing of uniform inside diameter extending through the reactor core, means for circulating a neutron detecting material in fluid form through said closed circuit, means for varying the velocity of said neutron detecting fluid passing through the reactor core during the circulation through said closed circuit and/or replacing said fluid by other fluids having different decay constants (half lives) of induced radioactivity and circulating these fluids at a constant velocity through the reactor core, means for detecting the radioactivity possessed in said fluid or fluids before and after said fluid or fluids pass through the reactor core thereby determining a predetermined neutron flux distribution function in which the induced radioactivity, the velocity of the fluid or fluids passing through the reactor core and the decay constant are independent variables, means for safely externally discharging or recombining the resolved or radiolysis gases produced due to the irradiation with neutrons on said fluid or fluids, means for adjusting the concentration of said fluid or fluids thereby varying the sensitivity of detection, and means for attenuating the induced radioactivity after the above measurement.

The above and other objects, features and advantages of the present invention will be apparent from the following detailed description of the invention taken in conjunction with the accompanying drawing, in which.

Figure 1:
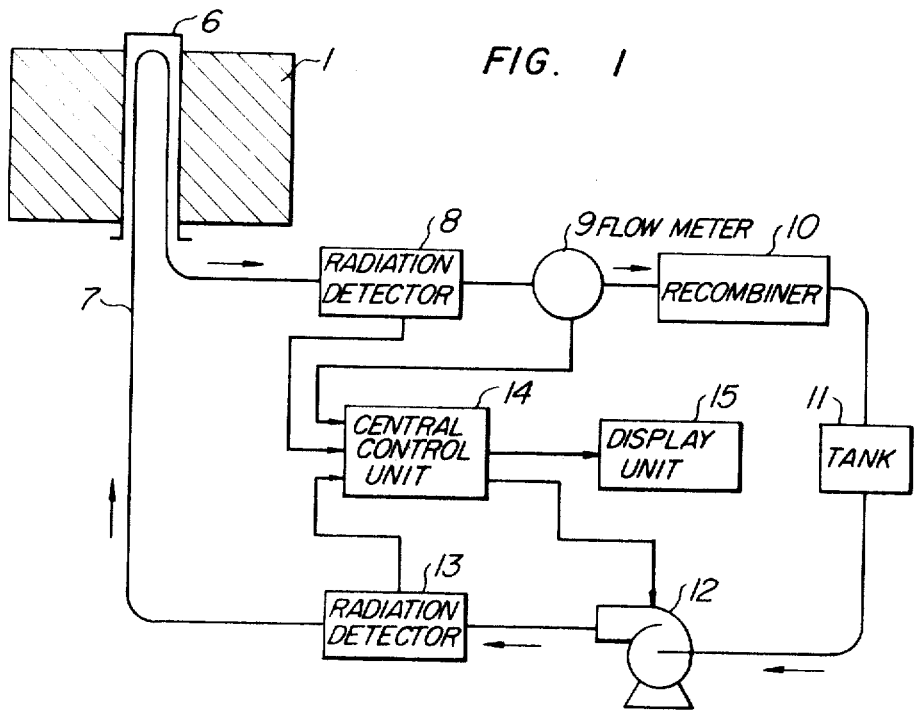
FIG. 1 is a block diagram of an embodiment of the present invention.

Before describing an embodiment of the present invention, the basic principle of the present invention will be described in detail.

When a neutron detecting fluid having a relatively short half life is continuously circulated through a closed circuit extending through the core of a nuclear reactor, the radioactivity induced in the neutron detecting fluid leaving the reactor core is increased with the increase in the period of time during which the fluid stays within the reactor core, hence the increase in the irradiation time, provided that it is irradiated with neutron flux of constant density. However, due to the fact that the density of neutron flux within the reactor core is not constant generally, the induced radioactivity depends upon the neutron flux distribution within the reactor core and upon the period of time required for the neutron detecting fluid to pass through the reactor core.

Further, activation of the neutron detecting fluid is started as soon as it enters the reactor core, but, on the other hand, the radionuclides produced by the activation are exponentially attenuated. Therefore, unless the neutron detecting fluid reaches the outlet from the reactor core within a period of time which is not so long as the half life thereof, the radioactivity induced in the fluid adjacent to the inlet to the reactor core is substantially attenuated and can be hardly measured at the outlet from the reactor core. Thus, the induced radioactivity measured at the outlet from the reactor core represents substantially the value produced at a portion near the outlet from the reactor core. It is therefore necessary to circulate the neutron detecting fluid at a high velocity in order to measure the radioactivity induced in the fluid at a portion in the vicinity of the inlet to the reactor core.

Thus, when the neutron detecting fluid is circulated at some velocity through the closed circuit, the induced radioactivity measured at the outlet from the reactor core represents an integrated value of the radioactivities induced in the fluid at many points between the inlet to and the outlet from the reactor core.

However, even if the radioactivity of the same amount were induced in the fluid at each point, attenuation occurs more in the radioactivities induced at the points nearer to the inlet to the reactor core, while attentuation occurs less in the radioactivities induced at the points nearer to the outlet from the reactor core, and thus the neutron flux portions existing at the points nearer to the outlet from the reactor core contribute more to the induced radioactivity measured at the outlet from the reactor core. In effect, the relation between the neutron flux within the reactor core and the induced radioactivity of the neutron detecting fluid measured at the outlet from the reactor core is such that the neutron flux contributes more to the radioactivity at the points nearer to the outlet from the reactor core and less at the points remoter from the outlet from the reactor core when the attenuation of the radioactivity induced in the neutron detecting fluid passing through the reactor core is taken into consideration.

As described above, the neutron flux at each point within the reactor core do not uniformly contribute to the induced radioactivity measured at the outlet from the reactor core, and the induced radioactivity measured at the outlet varies depending upon the velocity with which the neutron detecting fluid passes through the reactor core. Thus, the neutron flux distribution within the reactor core can be accurately determined when the neutron flux distribution within the reactor core is represented by a function consisting of n components as described below and the unknowns or coefficients in this function are sought by measurement taking the above point into account.

Generally, distribution of whatever form can be expressed by use of a suitable function. Fourier series expression is an example of such expansion. Of course, such an expansion is incomplete unless the expansion terms include an infinite term, but practically, satisfactory results can be obtained with finite terms only.

The neutron flux distribution within the reactor core may be defined by the following equation:

$$\Phi(x) = \phi_0 f_0(x) = \phi_1 f_1(x) + \ldots + \phi_n f_n(x)$$

(1)

where $x$ is an arbitrary position in the reactor core, $\Phi(x)$ is the neutron flux at the point X, $\phi_i$ is the amplitude of the $i$-th component, and $fi(x)$ is the distribution function at the amplitude 1.0 (for example, $fi(x) = \sin(i\pi/L) x$ where $L$ is the core height of the reactor).

The unknown $\phi_i$ on the right-hand side of the equation (1) can be sought from the following equation which is representative of the relation between the induced radioactivity possessed by the neutron detecting fluid at the outlet from the reactor core and the velocity with which the neutron detecting fluid passes through the reactor core, provided that the radioactivity of the neutron detecting fluid entering the reactor core is negligible:

$$A(v) = \phi_0 F_0(v) + \phi_1 F_1(v) + \ldots + \phi_n F_n(v)$$

(2)

where $v$ is the velocity with which the neutron detecting fluid passes through the reactor core, $A(v)$ is the induced radioactivity possessed by the neutron detecting fluid at the outlet from the reactor core when the fluid passes through the reactor core at the velocity $v$, and $Fi(v)$ represents the radioactivity induced in the fluid by the $i$-th component of the neutron flux. Thus, $Fi(v)$ represents the induced radioactivity measured at the outlet from the reactor core when the neutron detecting fluid passes at the velocity $v$ through the reactor core having the neutron flux distribution $fi(x)$.

The terms in the above equation (2) can be sought by actual measurement. Thus, when measurement is taken $n$ times while variously varying the velocity $v$ with which the neutron detecting fluid passes through the reactor core, n-dimensional first order simultaneous equations wherein the coefficients $\phi_0, \phi_1, \ldots \phi_n$ are unknowns can be obtained as follows:

$$A(v_1) = \phi_0 F_0(v_1) + \phi_1 F_1(v_1) + \ldots + \phi_n F_n(v_1)$$

.

(3)

.

$$A(v_n) = \phi_0 F_0(v_n) + \phi_1 F_1(v_n) + \ldots + \phi_n F_n(v_n)$$

Then, when the coefficients $\phi_0, \phi_1, \ldots \phi_n$ are sought from the above equations (3) and put into the equation (1), the neutron flux distribution within the reactor core can be determined. An improvement in the precision of measurement may be attained when measurement is taken more than $n$ times and the method of least squares is applied to the results of measurement.

The purpose of varying the velocity of the neutron detecting fluid is to vary the weight of the neutron flux portions at various points within the reactor core relative to the radioactivity measured at the outlet from the reactor core. Therefore, the entirely same result can be obtained by varying the decay constant $\lambda$ of the induced radioactivity in lieu of varying the velocity $v$ with which the neutron detecting fluid passes through the reactor core, since this weight is generally represented by an exponential function $\exp.(-[l/v]\lambda)$ where $l$ is the distance measured from the outlet from the reactor core, $v$ is the velocity with which the neutron detecting fluid passes through the reactor core, and $\lambda$ is the decay constant of the induced radioactivity. In other words, equations entirely similar to the above equations (2) and (3) hold even when various neutron detecting fluids having different half lives are employed in lieu of varying the velocity with which a single neutron detecting fluid passes through the reactor core and such fluids are passed through the reactor core at a constant velocity. In this case too, the coefficients $\phi_0, \phi_1, \ldots \phi_n$ in the equation (1) can be similarly sought. The coefficients in the equation (1) can also similarly be sought by the combination of the variation of the velocity with which a single neutron detecting fluid passes through the reactor core in the manner above described and the use of various neutron detecting fluids having different half lives as above described. For example, when two kinds of neutron detecting fluids are employed and measurement is taken on each fluid while varying the velocity of each fluid to two values, data thus obtained are substantially equivalent to those obtained when four kinds of neutron detecting fluids are employed and circulated at a constant velocity or when a single neutron detecting fluid is employed and circulated at four different velocities, and this is very efficient.

A shorter period of time is required for measurement when the neutron detecting fluid has a shorter half life of the radioactivity induced therein as described above. Therefore, the half life of the neutron detecting fluid is preferably as short as possible provided that it emits measurable radiation and can be easily handled. Radioactive materials having a half life of, for example, less than 30 seconds include $38m_{Cl}$ having a half life of 1 second, $116m_{In}$ having a half life of 2 seconds, $110_{Ag}$ having a half life of 24 seconds, and $46m_{Sc}$ having a half life of 20 seconds. It is preferred that these radioactive materials are used singly in the form of aqueous solutions of silver nitrate ($AgNO_3$), ammonium chloride ($NH_4Cl$), indium sulfate ($In_2(SO_4)_3$) and scandium sulfate ($Sc_2(SO_4)_3$), respectively, or a mixture of two or more of these solutions may be used.

FIG. 1 is a block diagram of an apparatus for measuring neutron flux according to the present invention. Referring to FIG. 1, a protecting tube 6 extends through a reactor core 1 in a direction in which the measurement of power distribution is taken. A tube 7 having a uniform inside diameter is disposed within the protecting tube 6 in a manner as shown, and a neutron detecting fluid of the kind above described is forcedly circulated through the tube 7 by a pump 12. Any radioactivity possessed by the neutron detecting fluid before it is irradiated with neutrons is detected by a γ radiation detector 13, while the radioactivity induced in the neutron detecting fluid after the irradiation with neutrons due to the passage through the reactor core 1 is detected by a γ radiation detector 8. The velocity of the neutron detecting fluid, that is, the velocity with which the neutron detecting fluid passes through the reactor core 1 is measured by a flow meter 9.

Thus, when the velocity of the neutron detecting fluid is varied to various values and the induced radioactivity is measured at each velocity, the unknowns or coefficients $\phi_0, \phi_1, \ldots \phi_n$ can be sought from the n-dimensional first order simultaneous equations or by the method of least squares described previously so that the power distribution within the reactor core 1 can be determined.

A central control unit 14 shown in FIG. 1 comprises means for receiving, as input data, the neutron flux distribution function above described, the value of the velocity of the neutron detecting fluid measured by the flow meter 9 and the value of the induced radioactivity of the fluid detected by the γ radiation detector 8 on the fluid leaving the reactor core 1, data processing means for compensating the input data applied to the data receiving means by the value of the radioactivity detected by the γ radiation detector 13 on the fluid before the irradiation with neutrons, means for seeking the amounts of velocity dependent activation by the components of the neutron flux distribution function on the basis of the data processed by the data processing means thereby preparing simultaneous equations, means for resolving the simultaneous equations for the purpose of seeking the unknowns in the simultaneous equations prepared by the preparing means, hence the amplitudes of the components of the neutron flux distribution function, and means for seeking the resultant neutron flux distribution on the basis of the data obtained by the equation resolving means thereby determining the neutron flux distribution function. The central control unit 14 comprises further means for transmitting the results to a display unit 15 such as a typewriter or cathode-ray tube, and means for supplying signals for controlling the velocity of the neutron detecting fluid, such as a signal for varying the velocity of the fluid passing through the reactor core 1, a signal for starting the pump 12 in response to the initiation of the measurement, and a signal for stopping the pump 12 at the end of the measurement.

A recombiner 10 is provided so that resolved gases produced due to radiolysis can be safely discharged out of the tube 7 or recombined therein. A tank 11 is provided for the purposes of concentration control and radioactivity attenuation. This tank 11 acts to adjust the concentration of the neutron detecting fluid thereby obtaining a suitable detection sensitivity. For example, it acts to decrease the concentration when the neutron flux density is high, while it acts to increase the concentration when the neutron flux density is low. The tank 11 acts also to retain the neutron detecting fluid therewithin for a suitable length of time before it flows into the reactor core 1 again so that the radioactivity possessed by the neutron detecting fluid can be rendered negligibly small before the fluid flows into the reactor core 1 for the next measurement.

Figure 2:
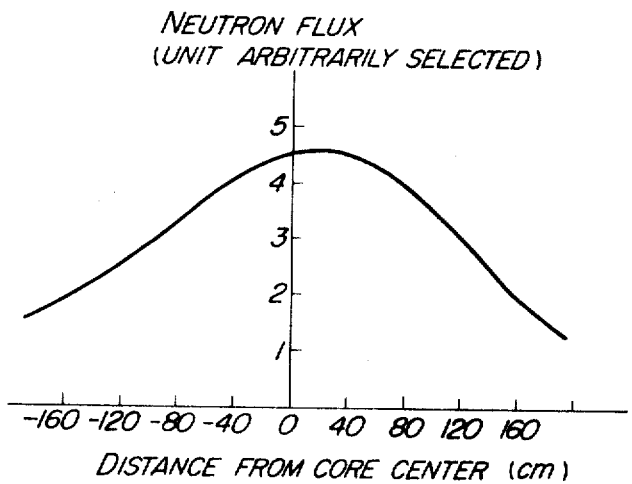
FIG. 2 is a curve showing an axial neutron flux distribution within a reactor core measured by the apparatus according to the present invention.

FIG. 2 shows the test results obtained when the present invention was applied to a conventional nuclear reactor for measuring the axial neutron flux distribution within the reactor core. In this test, the neutron detecting fluid was an aqueous solution of silver nitrate ($AgNO_3$), the distribution function in the equation (1) was $f_i = \cos(i\pi/L) x$ ($i = 0, 1, 2, 3$), $f_0$ being a constant, and the velocity of the neutron detecting fluid passing through the reactor core was varied to 0.5, 0.6, 0.7 and 0.8 centimeter per second.

While the above results show the neutron flux distribution in the axial direction of the reactor core, the neutron flux distribution along the path of the neutron detecting fluid can also be measured by the present invention. The tube 7 may be disposed in the radial direction of the reactor core when it is desired to measure the neutron flux distribution in the radial direction of the reactor core. In a conventional power reactor, the measuring tube 7 is preferably disposed in the axial direction of the reactor core as it is more convenient in view of the structural arrangement.

It will be understood from the foregoing description that the irradiation on a neutron detecting fluid and the measurement of radioactivity induced therein can be substantially simultaneously carried out according to the present invention. This is advantageous in that the period of time required for the measurement of neutron flux distribution can be remarkably reduced. The number of measurement of the radioactivity can be reduced and the period of time required for the measurement can be further shortened when the distribution function in the equation (1) is suitably selected. The present invention employs a neutron detecting material in fluid form in lieu of the conventional solid neutron detecting material. This is advantageous in that the neutron detecting material can be easily fed into and out of the reactor core and the neutron detection sensitivity can be easily varied. Thus, the present invention is applicable to nuclear reactors of various types including thermal reactors and fast breeders.

I claim:

1. An apparatus for measuring the neutron flux power distribution in a nuclear reactor in which the neutron flux distribution is represented by a predetermined function comprising closed circuit means formed by tubing having a uniform inside diameter disposed so as to extend through the reactor core for conveying a fluid in a closed path, means connected to said closed circuit means to supply into and receive from said closed circuit means a liquid containing a neutron detecting material sensitive to radioactivity, means for circulating said liquid through said closed circuit means, means for varying the velocity of said liquid circulating through said closed circuit means over a range of velocities, means for detecting the radioactivity possessed in said liquid before and after it passes through the reactor core, and central control means responsive to the output of said detecting means and the range of velocities of said liquid for determining from said predetermined function the neutron flux power distribution in the reactor.

2. An apparatus for measuring neutron flux power distribution as claimed in claim 1, in which said central control means includes means for regulating said velocity controlling means to vary the velocity with which said neutron detecting liquid circulating through said closed circuit means passes through the reactor core to various values within said range, and the velocity values of said liquid passing through the reactor core, the measured values of radioactivity detected by said induced radioactivity detecting means before and after said liquid passes through the reactor core at said velocities, a predetermined distribution function representative of neutron flux distribution within the reactor core, and the value of the half life of the radioactivity induced in said neutron detecting liquid flowing at said velocities being applied as inputs to said central control means which delivers said neutron flux power distribution as its output.

3. An apparatus for measuring neutron flux power distribution as claimed in claim 1, which comprises means for adjusting the concentration of said neutron detecting fluid thereby varying the neutron detection sensitivity thereof.

4. An apparatus for measuring neutron flux power distribution as claimed in claim 2, which comprises means for adjusting the concentration of said neutron detecting fluid thereby varying the neutron detection sensitivity thereof.

5. A method for measuring the neutron flux power distribution in a nuclear reactor in which the neutron flux distribution is represented by a predetermined function comprising the steps of circulating a liquid containing a neutron detecting material sensitive to radioactivity in a conduit of uniform inside diameter extending through the reactor core, detecting the radioactivity of said liquid before and after it passes through the reactor core, varying the velocity of the circulating liquid to selected values, and determining the neutron flux power distribution in accordance with said predetermined function, the selected values of velocity, the detected values of radioactivity and the half life of the radioactivity induced in said neutron detecting liquid.

6. A method for measuring the neutron flux power distribution in a nuclear reactor as defined in claim 5, wherein said circulating step includes circulating in succession different liquids having a different half life of induced radioactivity.

7. A method for measuring the neutron flux power distribution in a nuclear reactor as defined in claim 6, wherein the velocity of circulation of the liquid is held constant during circulation of at least one of said liquids having a different half life of induced radioactivity.

8. A method for measuring the neutron flux power distribution in a nuclear reactor in which the neutron flux distribution is represented by a predetermined function comprising the steps of circulating at a constant velocity in succession at least first and second liquids containing a neutron detecting material sensitive to radioactivity and having a different half life of induced radioactivity through a closed circuit conduit extending through the reactor core, detecting the radioactivity of said liquid before and after it passes through the reactor core, and determining the neutron flux power distribution in accordance with said predetermined function, the velocity of the liquid, the detected value of radioactivity and the half life of the radioactivity induced in said neutron detecting liquid.

* * * * *